United States Patent
Suzuki et al.

(10) Patent No.: US 6,715,592 B2
(45) Date of Patent: Apr. 6, 2004

(54) SHOCK ABSORBING STRUCTURE, AND ASSEMBLY INCLUDING THE STRUCTURE AND VEHICLE INTERIOR COMPONENT

(75) Inventors: Takane Suzuki, Toyota (JP); Akihiro Konda, Toyohashi (JP); Kaoru Itou, Nagoya (JP); Kazuyuki Fukushima, Toyota (JP)

(73) Assignees: Kojima Press Industry Co., Ltd., Toyoto (JP); Wakamiya Industry Co., Ltd., Toyota (JP)

( * ) Notice: Subject to any disclaimer, the term of this patent is extended or adjusted under 35 U.S.C. 154(b) by 0 days.

(21) Appl. No.: 09/904,290

(22) Filed: Jul. 12, 2001

(65) Prior Publication Data

US 2002/0066984 A1 Jun. 6, 2002

(30) Foreign Application Priority Data

Dec. 1, 2000 (JP) .......................... 2000-366655

(51) Int. Cl.$^7$ ........................ B60R 21/02; B60K 37/00
(52) U.S. Cl. ...................... 188/371; 188/377; 296/189
(58) Field of Search ............................. 188/371, 376, 188/377; 296/146.6, 146.7, 189

(56) References Cited

U.S. PATENT DOCUMENTS

| 4,969,680 | A | * | 11/1990 | Shimoda | 246/146 |
| 5,040,646 | A | * | 8/1991 | Drefahl | 188/371 |
| 6,036,227 | A | | 3/2000 | Lin et al. | |
| 6,082,792 | A | * | 7/2000 | Evans et al. | 293/133 |
| 6,126,231 | A | * | 10/2000 | Suzuki et al. | 296/189 |
| 6,247,745 | B1 | * | 6/2001 | Carroll, III et al. | 296/189 |
| 6,357,819 | B1 | * | 3/2002 | Yoshino | 296/189 |

FOREIGN PATENT DOCUMENTS

| DE | 40 03 952 A1 | 8/1991 |
| DE | 199 47 245 A1 | 4/2000 |
| JP | 9-150692 | 6/1997 |
| JP | 11-78738 | 3/1999 |
| JP | 11-348699 | 12/1999 |
| JP | 2000-211454 | 8/2000 |
| JP | 2000-211455 A | 8/2000 |

* cited by examiner

*Primary Examiner*—Matthew C. Graham
(74) *Attorney, Agent, or Firm*—Burr & Brown

(57) ABSTRACT

A shock absorbing structure for a vehicle, including (a) a plurality of main bodies each made of a resin and including a lateral wall that extends substantially in a shock-receiving direction in which a shock is to be primarily applied to the shock absorbing structure, and (b) at least one connecting body each made of a resin and connecting adjacent ones of the main bodies. Each of the at least one connecting body includes a first connecting portion and a second connecting portion. The first connecting portion has a shape configured to be deformable more easily in a perpendicular direction that is perpendicular to the shock-receiving direction, than in a parallel direction that is parallel to the shock-receiving direction. The second connecting portion has a shape configured to be deformable more easily in the parallel direction than in the perpendicular direction.

15 Claims, 5 Drawing Sheets

FIG. 5
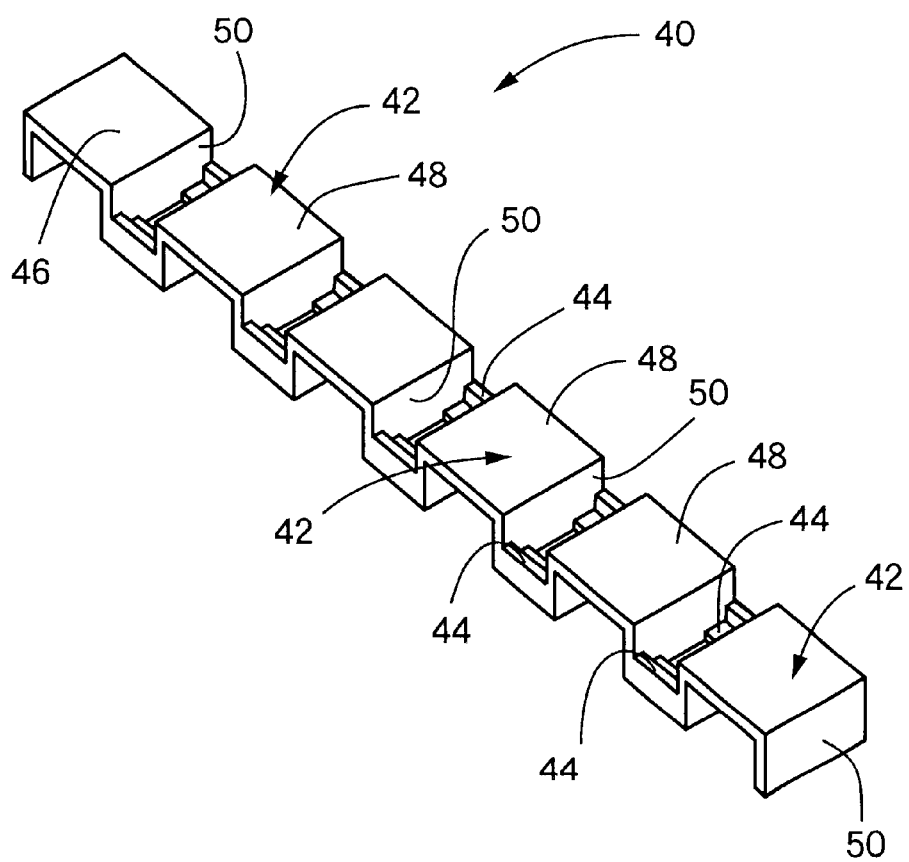

SHOCK ABSORBING STRUCTURE, AND ASSEMBLY INCLUDING THE STRUCTURE AND VEHICLE INTERIOR COMPONENT

BACKGROUND OF THE INVENTION

1. Field of the Invention

The present invention relates in general to a shock absorbing structure for a vehicle, and also an assembly including the shock absorbing structure and a pillar garnish, a roof side rail or other interior component of a vehicle. More particularly, the present invention is concerned with such a shock absorbing structure which is capable of being disposed in a narrow space located on one of opposite sides of the interior component that is remote from an occupants' compartment (driver's or passengers' compartment) of the vehicle, while exhibiting an improved shock absorbing effect. The present invention is also concerned with such an assembly including the shock absorbing structure and the interior component of the vehicle.

2. Discussion of Related Art

In a motor vehicle or other vehicle, in general, a shock absorbing structure is provided to be located adjacently to an interior component, such as a pillar garnish, a roof side rail, an instrument panel and a console box, which would be possibly brought into contact with an occupant's body in the event of a collision of the vehicle with a certain object. The shock absorbing structure is disposed on one of opposite sides of the interior component that is remote from an occupants' component of the vehicle, for alleviating an impact or shock applied to the occupant's body upon contact of the interior component with the occupant's body, so as to protect the occupant's body in the event of the collision.

As such a shock absorbing structure, there are known various types of structures which have respective constructions and which provide respective technical advantages owing to their own constructions. As examples of the shock absorbing structure, JP-A-11-348699, JP-A-2000-211454 and JP-A-09-150692 (which are laid-open publications of unexamined Japanese Patent Applications) disclose respective structures each including (a) a plurality of main bodies which are made of a resin and are spaced apart from each other, and (b) a plurality of connecting bodies which are made of a resin. Each of the main bodies consists of a box-like body, polygonal tubular body or tapered tubular body, and has a lateral wall which extends substantially in a direction in which a shock is primarily applied to the shock absorbing structure. Each of the connecting bodies connects adjacent two of the main bodies, so that the shock absorbing structure is provided by a single piece constituted by the main bodies and the connecting bodies.

Upon application of a shock to the shock absorbing structure constructed as described above, the applied shock acts as a compressive load on the lateral wall of each main body in the height direction of the lateral wall, thereby inducing deformation or buckling of the lateral wall in the height direction. In this instance, the buckled portions of the lateral wall are prevented from being folded or superposed on each other in the height direction, unlike in a shock absorbing structure in which a plurality of plate ribs made of a synthetic resin are arranged in a lattice. Since the buckled portions of the lateral wall are not superposed on each other, the shock energy is efficiently absorbed by each main body, even if the lateral wall has a reduced height so that a maximum distance of displacement of the buckled portions of the lateral wall is reduced. Thus, each shock absorbing structure disclosed in the Japanese publications has an advantage that the structure is capable of exhibiting a sufficiently high capacity of absorbing an applied shock, even with such a reduced size of the structure that makes it possible to install the structure in a relatively small space on the side of a pillar garnish, a roof side rail or other interior component, which side is remote from the occupants' compartment of the vehicle.

However, the space on the side of the pillar garnish or roof side rail varies in shape or configuration, depending upon the type of vehicle. It has been a common practice to prepare various shock absorbing structures having respective different shapes or configurations which are designed in accordance with the different shapes of the spaces in the various types of vehicles, thereby problematically impeding an increase in the production efficiency and a reduction in the production cost of the shock absorbing structure.

It might be considered possible that a shock absorbing structure, which is formed of a synthetic resin material having a high degree of flexibility and is made compact in size, is accommodated in the above-described space while being deformed or flexed therein, and is positioned relative to the space so as to permit the main bodies to efficiently absorb the shock applied to the structure.

The structure is required to have a certain degree of rigidity which prevents easy displacement of the structure from the nominal position within the space upon application of the shock to the structure, for effectively absorbing the applied shock with high reliability. However, the structure formed of the material having the high degree of flexibility does not actually have the required degree of rigidity.

Thus, the conventional shock absorbing structure is not capable of being accommodated into any one of the spaces having various shapes or configurations, without deteriorating its shock absorbing capacity. That is, it is practically impossible for the conventional shock absorbing structure to solve the above-described problems as to the production efficiency and the production cost.

SUMMARY OF THE INVENTION

It is therefore a first object of the present invention to provide a shock absorbing structure which provides a high shock absorbing effect with respect to an impact or shock applied to the structure and which is compact in construction permitting the structure to be accommodated into any one of narrow spaces having respective different shapes or configurations, advantageously leading to an increase in the production efficiency and a reduction in the production cost of the shock absorbing structure.

It is a second object of the invention to provide an assembly which includes the shock absorbing structure and a vehicle interior component and which is capable of reliably protecting an occupant (driver or passenger) of a vehicle in the event of a collision of the vehicle with a certain object.

The above first object may be achieved according to a first aspect of the present invention, which provides a shock absorbing structure for a vehicle, comprising: (a) a plurality of main bodies each made of a resin and including a lateral wall that extends substantially in a shock-receiving direction in which a shock is to be primarily applied to the shock absorbing structure, the main bodies being spaced apart from each other such that the lateral walls of the main bodies are opposed to each other in a direction in which the main bodies are spaced apart from each other; and (b) at least one connecting body each made of a resin, and connecting adjacent ones of the main bodies, wherein each of the above-described at least one connecting body includes a first connecting portion and a second connecting portion, wherein the first connecting portion has a shape configured to be deformable more easily in a perpendicular direction that is perpendicular to the shock-receiving direction, than in a parallel direction that is parallel to the shock-receiving direction, and wherein the second connecting portion has a shape configured to be deformable more easily in the parallel direction than in the perpendicular direction.

In the shock absorbing structure constructed according to the first aspect of the present invention, each of the plurality of main bodies made of the resin material may consist of a box-like or tubular body having the lateral wall that extends substantially in the shock-receiving direction. The main bodies are positioned relative to each other so as to be spaced apart from each other, and are connected to each other by the connecting bodies made of the resin material. Each of the connecting bodies connects adjacent ones of the main bodies, and includes the first and second connecting portions each of which extends between the adjacent ones of the main bodies. The first and second connecting portions are made of the resin material which has a certain degree of flexibility, so that the first and second connecting portions can be deformed or deflected for permitting the shock absorbing structure to be accommodated into a space even if the space has a shape or configuration different from that of the entirety of the structure. That is, the first and second connecting portions are made deformed in accordance with the configuration of the space, so as to be easily accommodated in the space such that the main bodies are positioned in respective positions that enable the main bodies to effectively absorb the shock energy.

Further, in the present shock absorbing structure, the first connecting portion of each connecting body has the shape configured to be deformable or deflectable easily in the perpendicular direction perpendicular to the shock-receiving direction and to be less deformable or deflectable in the parallel direction parallel to the shock-receiving direction, while the second connecting portion of each connecting body has the shape configured to be deformable or deflectable easily in the parallel direction and to be less deformable or deflectable in the perpendicular direction. It is accordingly possible to easily and accurately adjust a permissible maximum amount of deflection of the connecting body in the parallel direction and that in the perpendicular direction, by changing the shapes of the respective first and second connecting portions. In this arrangement, the connecting body can be more easily given a suitable degree of rigidity while maintaining a suitable degree of flexibility, than in an arrangement in which the permissible maximum amount of the deflection of the connecting body is adjusted by simply changing the resin materials of the respective first and second connecting portions.

Accordingly, the present shock absorbing structure can be made compact in construction permitting the structure to be accommodated into any one of narrow spaces having respective different shapes or configurations, advantageously leading to an increase in the production efficiency and a reduction in the production cost of the shock absorbing structure. It is noted that the term "shock-receiving direction" defined as the direction in which the impact or shock is primarily applied to the shock absorbing structure, may be interpreted to mean a direction in which the shock is actually applied to the structure, and also mean any one of directions each of which is close or almost parallel to the direction of the actual application of the shock.

The above first object may be also achieved according to a second aspect of the present invention, which provides a shock absorbing structure for a vehicle, comprising: (a) a plurality of main bodies each made of a resin and including a lateral wall that extends substantially in a shock-receiving direction in which a shock is to be primarily applied to the shock absorbing structure, the main bodies being spaced apart from each other such that the lateral walls of the main bodies are opposed to each other in a direction in which the main bodies are spaced apart from each other; and (b) at least one connecting body each made of a resin, and connecting adjacent ones of the main bodies, wherein each of the above-described at least one connecting body includes a first connecting portion and a second connecting portion which consist of respective plates, wherein the first connecting portion has a thickness as measured in a perpendicular direction perpendicular to the shock-receiving direction, and a width as measured in a parallel direction parallel to the shock-receiving direction, the thickness of the first connecting portion being smaller than the width of the first connecting portion so that the first connecting portion is deformable more easily in the perpendicular direction than in the parallel direction, and wherein the second connecting portion has a thickness as measured in the parallel direction and a width as measured in the perpendicular direction, the thickness of the second connecting portion being smaller than the width of the second connecting portion so that the second connecting portion is deformable more easily in the parallel direction than in the perpendicular direction.

In the shock absorbing structure constructed according to the second aspect of the invention, the plurality of main bodies made of the resin material may consist of a box-like body or tubular body having the lateral wall that extends substantially in the shock-receiving direction. Each of the connecting bodies connects adjacent ones of the main bodies, and includes the first and second connecting portions each of which extends between the adjacent ones of the main bodies and is made of the resin material which has a certain degree of flexibility. The first connecting portion of each connecting body is deformable or deflectable easily in the perpendicular direction perpendicular to the shock-receiving direction and less deformable or deflectable in the parallel direction parallel to the shock-receiving direction, while the second connecting portion of each connecting body is deformable or deflectable easily in the parallel direction and less deformable or deflectable in the perpendicular direction. Accordingly, like the above-described shock absorbing structure of the fist aspect of the invention, this shock absorbing structure can be made compact in construction permitting the structure to be accommodated into any one of narrow spaces having respective different shapes or configurations, leading to an increase in the production efficiency and a reduction in the production cost of the shock absorbing structure.

Further, in the shock absorbing structure according to the second aspect of the invention, the first and second connecting portions of each connecting body consist of the respective plates, wherein the thickness of the first connecting portion as measured in the perpendicular direction perpendicular to the shock-receiving direction is smaller than the width of the first connecting portion as measured in the parallel direction parallel to the shock-receiving direction so that the first connecting portion is deformable easily in the perpendicular direction and less deformable in the parallel direction, while the thickness of the second connecting portion as measured in the parallel direction is smaller than the width of the second connecting portion as measured in the perpendicular direction so that the second connecting portion is deformable easily in the parallel direction and less deformable in the perpendicular direction. Therefore, the rigidity of the connecting body or the rigidity of the entirety of the shock absorbing structure is easily and accurately adjusted to an optimum degree by simply changing the thickness and width of the first connecting portion and those of the second connecting portion.

Accordingly, the shock absorbing structure according to the second aspect of the invention can be further advantageously made compact in construction permitting the structure to be accommodated into any one of narrow spaces having respective different shapes or configurations, leading to an increase in the production efficiency and a reduction in the production cost of the shock absorbing structure.

The above first object may be also achieved according to a third aspect of the present invention, which provides a shock absorbing structure for a vehicle, comprising: (a) a plurality of tubular main bodies each made of a resin and including a tubular wall and an axis that is substantially parallel to a shock-receiving direction in which a shock is to be primarily applied to the shock absorbing structure, the tubular main bodies being spaced apart from each other such that the tubular walls of the tubular main bodies are opposed to each other in a direction in which the main bodies are spaced apart from each other; and (b) at least one connecting body each made of a resin, and connecting adjacent ones of the tubular main bodies, wherein each of the above-described at least one connecting body includes a first connecting portion and a second connecting portion which consist of respective plates, wherein the first connecting portion has a thickness as measured in a perpendicular direction perpendicular to the axis of each of the tubular main bodies, and a width as measured in a parallel direction parallel to the axis of each of the tubular main body bodies, the thickness of the first connecting portion being smaller than the width of the first connecting portion so that the first connecting portion is deformable more easily in the perpendicular direction than in the parallel direction, and wherein the second connecting portion has a thickness as measured in the parallel direction and a width as measured in the perpendicular direction, the thickness of the second connecting portion being smaller than the width of the second connecting portion so that the second connecting portion is deformable more easily in the parallel direction than in the perpendicular direction.

In the shock absorbing structure constructed according to the third aspect of the invention in which each of the main body includes the tubular wall and the axis that is parallel to the shock-receiving direction, the tubular wall is deformed or buckled in its height direction that substantially coincides with the shock-receiving direction, upon application of an impact or shock to the shock absorbing structure. In this instance, an energy of the shock is efficiently absorbed by each buckled main body. Thus, the shock absorbing structure of this third aspect of the invention has an advantage of exhibiting a sufficiently high shock absorbing capacity, in addition to the above-described advantage that the structure can be made compact in construction permitting the structure to be accommodated into any one of narrow spaces having respective different shapes or configurations. It is noted that the tubular main body may consist of either of a polygonal body and a cylindrical body, namely, the tubular wall of the tubular main body may consist of a plurality of lateral walls or a cylindrical wall. It is also noted that a cross sectional area of the tubular main body taken in a plane perpendicular to the axis may be constant throughout the axial length of the tubular main body, or may be changed in the axial direction.

According to one preferred form of the above-described first or second aspect of the invention, each of the main bodies consists of two lateral walls extending substantially in the shock-receiving direction and opposed to each other, and a ceiling wall extending from one of the two lateral walls to the other of the two lateral walls so to connect the two lateral walls.

According to one preferred form of the second or third aspect of the invention, each of the connecting bodies has a L shape in a cross section thereof taken in a plane perpendicular to the direction in which the lateral walls of the main bodies are opposed to each other, each of the connecting bodies including a vertical plate portion and a horizontal plate portion which are provided by the first and second connecting portions, respectively, the horizontal plate portion extending in the perpendicular direction, from one of widthwise opposite end portions of the vertical plate portion which is parallel to the parallel direction.

In the shock absorbing structure of this preferred form of the second or third aspect of the invention, the vertical wall portion and the horizontal wall portion provided by the respective first and second connecting portions cooperate with each other to provide the structure with required degrees of flexibility and rigidity. Further, one of the vertical and horizontal wall portions serves as a reinforcing portion for reinforcing the other of the vertical and horizontal wall portions, so as to connect the main bodies with a sufficiently large strength. Thus, this shock absorbing structure can be made compact in size and given a sufficient mechanical strength.

According to one preferred form of the third aspect of the invention, each of the tubular main bodies has a cross section taken in a plane perpendicular to the axis, the cross section having an area which changes as viewed in the axial direction.

In the shock absorbing structure of this preferred form of the invention, when the tubular wall is buckled in its height direction upon application of a shock to the structure, deformed portions of the lateral wall are prevented from being superposed on each other in the height direction, owing to the arrangement in which the cross sectional area of the tubular main body is not constant but changes in the axial direction. Thus, the shock energy is efficiently absorbed by each buckled main body, even if the tubular wall has a reduced length as measured in the height direction.

According to one preferred form of the first, second or third aspect of the invention, the main bodies are arranged in a single line that is parallel to the direction in which the lateral walls or tubular wall of the main bodies are opposed to each other, so that the shock absorbing structure is further easily made compact in construction.

According to another preferred form of the first, second or third aspect of the invention, the shock absorbing structure further comprises a fixing device which fixes the main bodies to a component of the vehicle, wherein the fixing device is provided by at least one engaging member each of which includes a strut extending from a corresponding one of the connecting bodies, and an engager extending from a distal end of the strut toward the corresponding one of the connecting bodies, the engager having, in a free distal end portion thereof, a plurality of engaging shoulders spaced apart from each other in a direction in which the engager extends, the engager being elastically deformable so as to be brought into engagement at one of the engaging shoulders with an engaging portion of the component of the vehicle, whereby the main bodies are fixed to the component of the vehicle.

The fixing device makes it possible to fix the main bodies or the entirety of the shock absorbing structure to the vehicle component, even where a distance between the free distal end portion of the engager of each engaging member and the engaging portion of the vehicle component is not constant due to deformation or deflection of the connecting bodies or due to a complicated shape of the vehicle component. Namely, the engager is brought into engagement, at one of the engaging shoulders which are provided by the free distal end portion of the engager and which are spaced apart from each other, with the engaging portion of the vehicle component, wherein the one of the engaging shoulders brought into engagement with the engaging portion is selected depending upon the above-described distance. Therefore, the shock absorbing structure of this preferred form of the first, second or third aspect of the invention is capable of being further reliably accommodated into any one of narrow spaces having respective different shapes or configurations.

According to a further preferred form of the first, second or third aspect of the invention, the main bodies and the connecting bodies are provided by a single piece which is made of a synthetic resin having a certain degree of flexibility.

According to a still further preferred form of the first, second or third aspect of the invention, the connecting bodies are made of a synthetic resin having a certain degree of flexibility.

The above-described second object may be achieved according to a fourth aspect of the present invention, which provides a shock absorbing assembly for a vehicle, comprising: (a) the shock absorbing structure defined in any one of the above-described first, second and third aspects of the invention; and (b) an interior component of the vehicle, wherein the shock absorbing structure is disposed on one of opposite sides of the interior component that is remote from an occupants' compartment of the vehicle, and is mounted on a portion of the interior component which is closer to an occupant seated in an occupant's seat in the occupant compartment of the vehicle, than the other portion of the interior compartment.

In the present shock absorbing assembly, the shock absorbing structure is disposed on the side of a pillar garnish, roof side rail or other interior component which side is remote from the occupants' compartment of the vehicle, and is mounted on the portion of the interior component which portion is the closest to the occupant seated in the occupant's seat. In other words, the shock absorbing structure is disposed on the side of a portion of the interior component which is likely to be brought into contact with the occupant with higher probability in the event of the collision, than the other portion of the interior component.

Thus, the present assembly is capable of protect the vehicle occupant from a shock or impact force upon the collision. It is noted that the term "occupant" should be interpreted to mean not only a driver of the vehicle but also a passenger of the vehicle, and that the "occupant" may be interpreted to particularly mean the head of the occupant where the shock absorbing structure is disposed on the side of the pillar garnish or roof side rail as the vehicle interior component.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which:

FIG. 5 is a perspective view showing a shock absorbing structure constructed according to another embodiment of the invention.

DETAILED DESCRIPTION OF THE PREFERRED EMBODIMENTS

Referring to FIGS. 1–4, there will be described a shock absorbing structure 10 constructed according to one embodiment of this invention.

Figure 1:
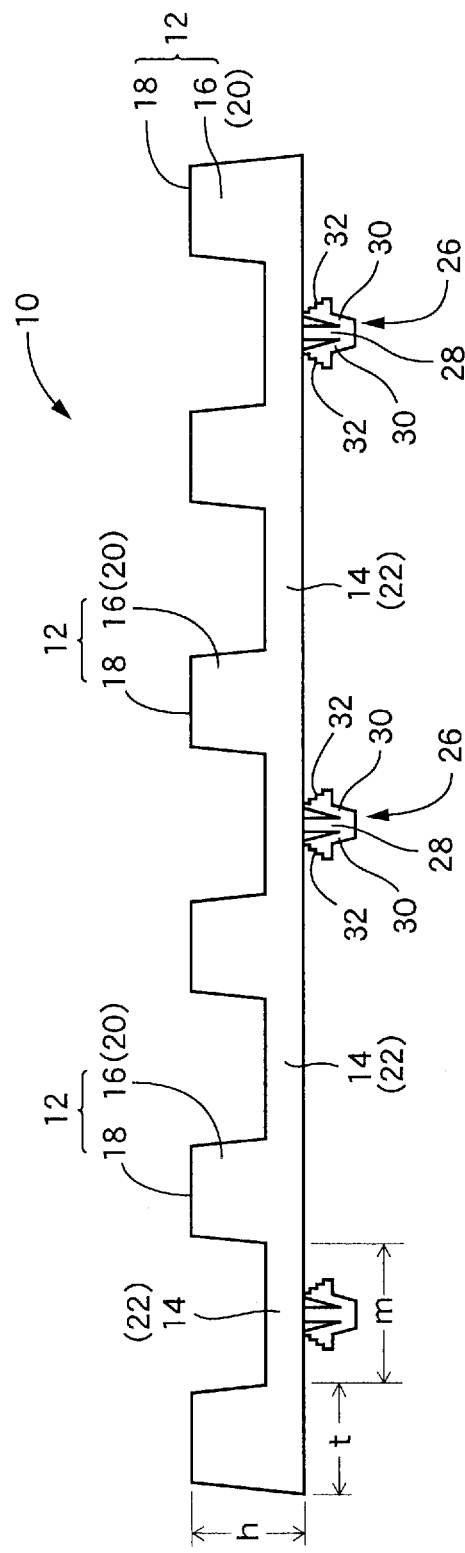
FIG. 1 is a front view showing a shock absorbing structure constructed according to one embodiment of this invention.
Figure 2:
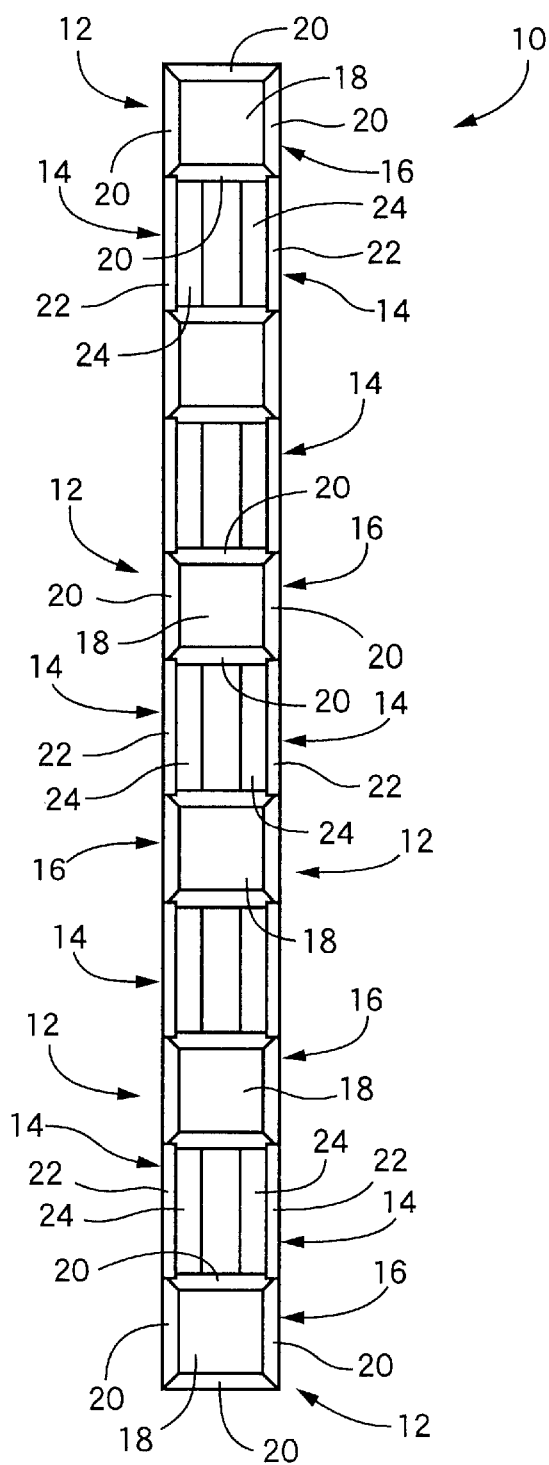
FIG. 2 is a plan view showing the shock absorbing structure of FIG. 1.

FIGS. 1 and 2 are front and plan views of the shock absorbing structure 10 disposed on one of opposite sides of a pillar garnish of a motor vehicle which one is remote from a vehicle occupants' compartment of the motor vehicle. As is apparent from these figures, the shock absorbing structure 10 is constituted principally by a generally elongated member, and includes a plurality of tubular main bodies 12 and a plurality of connecting bodies 14. The tubular main bodies 12 are spaced apart from each other in the longitudinal direction of the shock absorbing structure 10, and are connected by the connecting bodies 14 each of which is elongated in the longitudinal direction of the shock absorbing structure 10.

Described more specifically, each of the tubular main bodies 12 has a generally rectangular ceiling wall 18 and a peripheral or tubular wall 16 which consists of four lateral walls 20. Each of the four lateral walls 20 consists of a thin-walled, trapezoidal plate having upper and lower sides which are parallel to each other. The upper side of each lateral wall 20 is shorter than the lower side of each lateral wall 20 by a predetermined amount. Each lateral wall 20 extends in a direction slightly inclined with respect to the axis of the tubular main body 12 such that the distance from the lateral wall 20 to the axis is reduced as viewed in a direction away from the lower side of the lateral wall 20 toward the upper side of the lateral wall 20. The direction in which each lateral wall 20 extends will be referred to as "lateral-wall extending direction" in the following description. The ceiling wall 18 consists of a thin-walled plate having a thickness substantially equal to that of the trapezoidal plate of each later wall 20. The rectangular ceiling wall 18 is connected at its four sides with the upper sides of the respective lateral walls 20.

In other words, the tubular main body 12 has the tubular wall 16 which consists of the four lateral walls 20, and the ceiling wall 18 which is formed integrally with the tubular wall 16 so as to close the upper one of axially opposite opening ends of the tubular wall 16. The tubular main body 12 has a rectangular shape in its cross section taken in a plane perpendicular to the axis. The cross section has an area which gradually decreases as viewed in the direction away from the lower side of the lateral wall 20 toward the upper side of the lateral wall 20.

In the shock absorbing structure 10 of the present embodiment, the six tubular main bodies 12 are provided to be arranged in a single straight line in the longitudinal direction of the structure 10, with a constant spacing distance therebetween, such that the lateral walls 20 of each pair of main bodies 12 adjacent to each other are opposed to each other in the longitudinal direction of the structure 10.

Between each pair of the main bodies 12, two connecting bodies 14 are provided to connect therebetween. Each of the two connecting bodies 14 is fixed at its longitudinally opposite end portions with the lower end portions of the respective mutually opposed lateral walls 20 of the pair of main bodies 12. Described more specifically, the two connecting bodies 14 extend in parallel with each other, from respective widthwise opposite end portions of the lower end portion of the lateral wall 20 of one of the pair of main bodies 12, to respective widthwise opposite end portions of the lower end portion of the lateral wall 20 of the other of the pair of main bodies 12.

The plurality of tubular main bodies 12 and the plurality of connecting bodies 14 are provided by a single piece which is made of an olefin resin material, such as polypropylene, polyethylene, polybutene and other synthetic resin, having suitable degrees of deformability and flexibility. The single piece is formed of such a material, for example, in an injection molding operation. Each tubular main body 12 can be easily deformed or buckled owing to the material having the suitable degree of deformability. Each tubular main body 12 is easily deformed or buckled in the height or axial direction of the main body 12 upon application of a shock to the structure 10. In this instance, buckled portions of each lateral wall 20 of the main body 12 are prevented from being superposed on each other in the axial direction, owing to the arrangement in which the cross sectional area of the main body 12 reduces as viewed in the direction away from the axially proximal end of the main body 12 toward the axially distal end of the main body 12. Each connecting body 14 can be easily deformed or deflected owing to the material having the suitable degree of flexibility. The deflection of each connecting body 14 provides deformation of the entirety of the structure 10.

Each main body 12 has a thickness t of about 25 mm as measured in the longitudinal direction of the structure 10, a width w of about 25 mm as measured in a direction perpendicular to the longitudinal direction of the structure 10 and the axial direction of the main body 12, and a height h of 25 mm as measured in a direction parallel to the axial direction of the main body 12. Each connecting body 14 has a length m of about 30 mm as measured in the longitudinal direction of the structure 10. Thus, each main body 12 and each connecting body 14 are made relatively small in size and length, respectively, whereby the structure 10 is made compact in its entirety, so as to be accommodatable in a space on the side of a pillar garnish of any one of various types of motor vehicles.

Although the main body 12 has the height h as small as about 25 mm, the main body 12 is provided with a sufficiently large effective distance over which the main body 12 is likely to be deformed in the height direction. That is, since the main body 12 is easily buckled in the axial direction while the deformed portions of each lateral wall 20 of the main body 12 are prevented from being superposed on each other in the axial direction, as described above, the main body 12 is provided with a sufficiently high ratio that is expressed by (a−b)/a, where a represents the height of the main body 12 before the deformation of the structure 10, while b represents the height of the main body 12 after the deformation of the structure 10. It is preferable that the height h of the main body 12 is reduced as further as possible, without an excessively large amount of reduction of the above-described large effective distance, since a further reduced height h of the main body 12 makes it possible to accommodate the structure 10 into a space on the side of a pillar garnish of any one of a larger number of different types of motor vehicles. In this point of view, the height h of the main body 12 is more preferable about 20 mm.

Each of the thickness t and the width w of the main body 12 is not limited to 25 mm, either, but may be suitably changed, for example, in view of the size of the pillar garnish partially defining the space in which the structure 10 is to be accommodated. Since the pillar garnish has, in general, an elongated shape, the thickness t of the main body 12 may be larger than 25 mm while the width w of the main body 12 is somewhat limited. Further, a considerable increase in the width w of the main body 12 causes a change in shock absorbing characteristics of the structure 10. Thus, it is preferable that the width w of the main body 12 is not larger than 25 mm. As to the length m of each connecting body 14, although the length m is not particularly limited as long as the length m does not considerably impede a reduction in the longitudinal length of the structure 10, it is preferable that the length m is not larger than 30 mm, for preventing a considerable change in the shock absorbing characteristics of the structure 10.

Each connecting body 14 has a first connecting portion in the form of a vertical wall portion 22, and a second connecting portion in the form of a horizontal wall portion 24. The vertical wall portion 22 consists of a thin-walled plate which is elongated in the longitudinal direction of the structure 10. The vertical wall portion 22 is substantially parallel to the height direction of each main body 12, namely, parallel to two of the four lateral walls 20 of each main body 12 which are parallel to the longitudinal direction of the structure 10. The horizontal wall portion 24 consists of a thin-walled plate which is also elongated in the longitudinal direction of the structure 10. The horizontal wall portion 24 is parallel to the ceiling wall 18 of each main body 12, and extends from the lower end portion of the vertical wall portion 22 in the width direction of each main body 12, namely, in a direction substantially perpendicular to the above-described two of the four lateral walls 20 of each main body 12.

Figure 3:
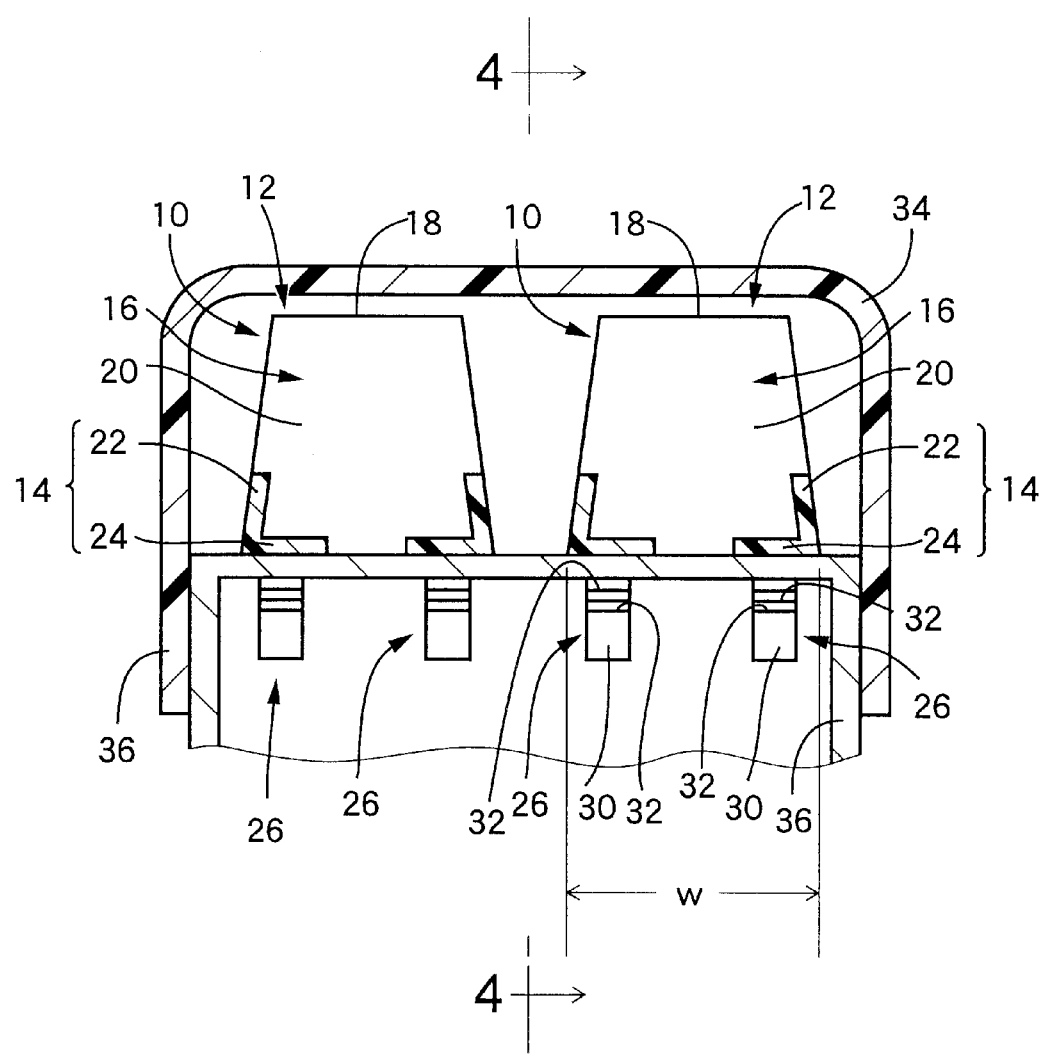
FIG. 3 is a cross sectional view taken along line 3—3 of FIG. 4, and showing the shock absorbing structure of FIG. 1 as disposed in a space between a pillar garnish and a center pillar of a motor vehicle.

In other words, each connecting body 14 has a L shape in its cross section taken in a plane perpendicular to the longitudinal direction of the structure 10, i.e., in a direction in which the lateral walls 20 of the respective two main bodies 12 connected by the connecting body 14 are opposed to each other, as shown in FIG. 3. The vertical wall portion 22 has a predetermined thickness as measured in the width direction of the main body 12 that corresponds to a direction perpendicular to the above-described lateral-wall extending direction, and a predetermined width as measured in the height direction of the main body 12 that corresponds to the lateral-wall extending direction. The horizontal wall portion 24 has a predetermined thickness as measured in the height direction of the main body 12 that corresponds to the lateral-wall extending direction, and a predetermined width as measured in the width direction of the main body 12 that corresponds to the direction perpendicular to the lateral-wall extending direction.

The thickness of the vertical wall portion 22 is smaller than the width of the vertical wall portion 22, so that a deflection or deformation of the vertical wall portion 22 in the direction perpendicular to the lateral-wall extending direction is easily caused while that in the lateral-wall extending direction is not easily caused. Similarly, the thickness of the horizontal wall portion 24 is smaller than the width of the horizontal wall portion 24, so that a deflection or deformation of the horizontal wall portion 24 in the lateral-wall extending direction is easily caused while that in the direction perpendicular to the lateral-wall extending direction is not easily caused. It is possible to easily and accurately adjust the flexibility and rigidity of the connecting body 14, namely, a permissible maximum amount of deformation of the connecting body 14 in the lateral-wall extending direction and that in the direction perpendicular to the lateral-wall extending direction, by suitably changing the thickness and width of the vertical wall portion 22 and those of the horizontal wall portion 24.

To this end, the thickness and width of the vertical wall portion 22 and those of the horizontal wall portion 24 are suitably determined in view of the permissible maximum amount of the deformation of the connecting body 14 which amount provides an optimum ratio of the flexibility of the structure 10 to the rigidity of the structure 10. In the present embodiment, the thickness of the vertical wall portion 22 is about 0.8 mm–2 mm, while the width of the vertical wall portion 22 is not larger than a half of the height of the lateral wall 20 of the main body 12. The thickness of the horizontal wall portion 24 is about 1.5 mm–3 mm, while the width of the horizontal wall portion 24 is substantially equal to that of the vertical wall portion 22. These dimensions of the vertical and horizontal wall portions 22, 24 provide the structure 10 with suitable degrees of the flexibility and rigidity, while maintaining the above-described effective distance at a sufficiently large amount.

On the lower surface of the horizontal wall portion 24 of the connecting body 14, there is formed an engaging member in the form of an engaging clip 26 which has a construction substantially identical with that of an engaging member disclosed in JP-A-08-145021. The engaging clip 26 includes a strut 28 extending downwardly from the lower surface of the horizontal wall portion 24 over a predetermined distance in a direction substantially parallel to the above-described lateral-wall extending direction, and an arm-like engager 30 extending from a distal end of the strut 28 toward the lower surface of the horizontal wall portion 24. The engager 30 extends in such a direction that causes the engager 30 to gradually separate from the strut 28 as the engager 30 extends away from the distal end of the strut 28 toward the lower surface of the horizontal wall portion 24. The engaging clip 26 consists of an elastic member having a certain degree of elasticity so that the engaging clip 26 is capable of producing an elastic force for restoring the engager 30 to its original position or shape when the engager 30 is forced radially inwardly toward the strut 28. The engager 30 of the engaging clip 26 has a stepped surface in an outer peripheral surface of its free distal end portion. The stepped surface has a plurality of engaging shoulders 32 formed therein and spaced apart from each other in the direction in which the engager 30 extends. The engaging clip 26 constitutes a fixing device for fixing the main bodies 12 to a vehicle component.

Figure 4:
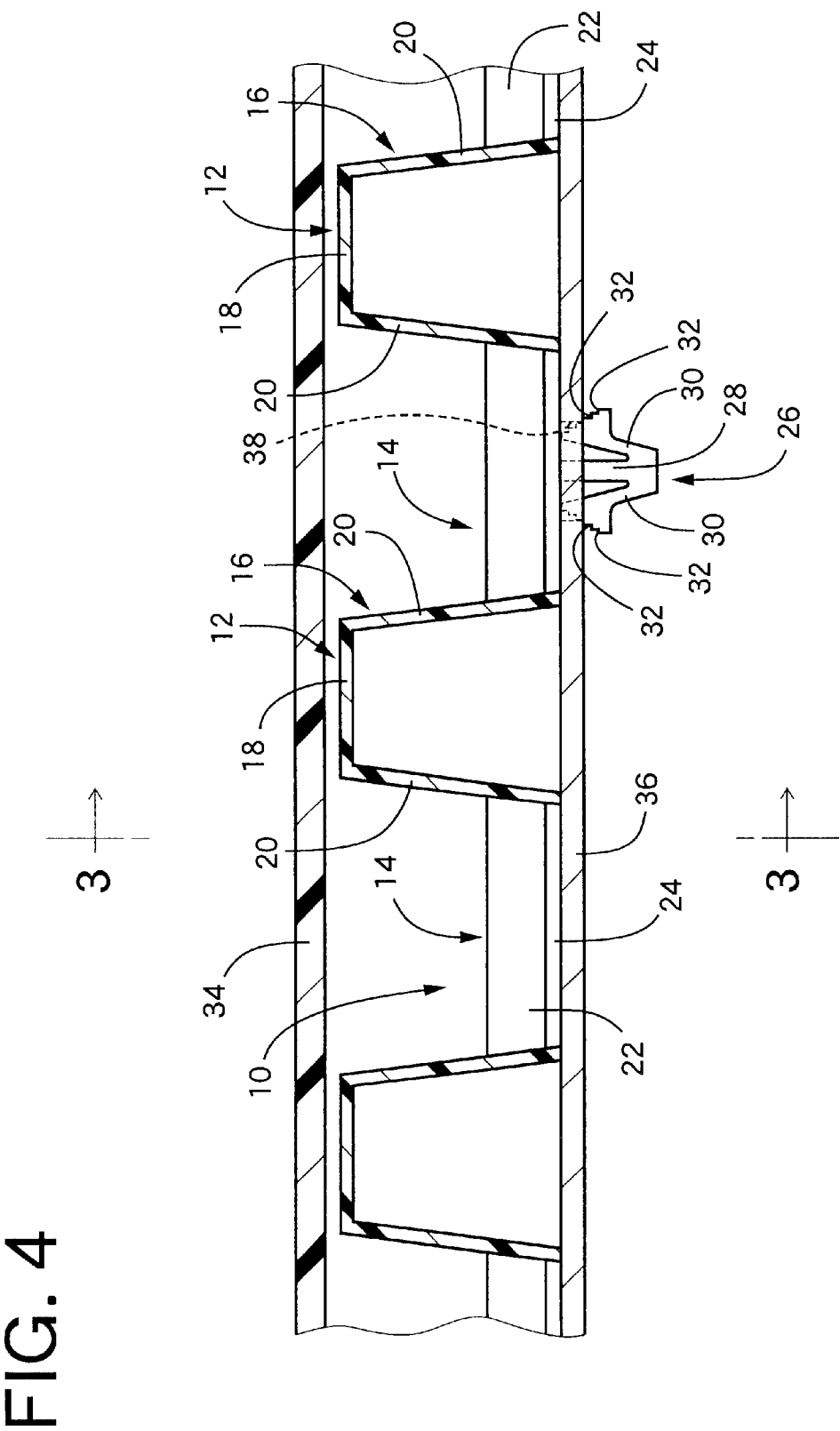
FIG. 4 is a cross sectional view taken along line 4—4 of FIG. 3.

The shock absorbing structure 10 constructed as described above is disposed in one of opposite sides of a vehicle interior component in the form of a pillar garnish 34 which one is remote from a vehicle occupants' compartment, namely, accommodated in an elongated space defined by and between the pillar garnish 34 and a vehicle component in the form of a center pillar 36, as shown in FIGS. 3 and 4 by way of example.

Described more specifically, the structure 10 is interposed between the pillar garnish 34 and the center pillar 36 as viewed in a direction in which the pillar garnish 34 and the center pillar 36 are opposed to each other, such that the lateral walls 20 of the tubular wall 16 extends away from the center pillar 36 toward the pillar garnish 34, and such that the ceiling wall 18 is opposed to a surface of the pillar garnish 34 which surface is opposed to center pillar 36. The horizontal wall portion 24 of each connecting body 14 is held substantially in contact with a surface of the center pillar 36 which surface is opposed to the pillar garnish 34. It is noted that the shock absorbing structure 10 cooperates with the pillar garnish 34 as the vehicle interior component to constitute a shock absorbing assembly.

In the present embodiment, two shock absorbing structures 10 are provided in the pillar garnish 34 adapted to cover a portion of the center pillar 36 which portion faces the vehicle occupants' compartment, as shown in FIG. 3. The two shock absorbing structures 10, which are accommodated in the elongated space between the pillar garnish 34 and the center pillar 36, are spaced apart from each other in the width direction of the space and extend substantially in parallel with each other in the longitudinal direction of the space. The connecting bodies 14 of the two structures 10 are suitably deformed or deflected in accordance with the shape or configuration of the elongated space, such that the two structures 10 extend along the shape of elongated space. The two structures 10 are mounted on a portion of the pillar garnish 34 which is the closest to an occupant who is seated in an occupant's seat in the occupants' compartment of the motor vehicle. In other words, the structures 10 are disposed in such a position that permits the main bodies 12 to most efficiently absorb a shock energy generated by contact of the occupant with the pillar garnish 34.

The position of the shock absorbing structure 10 relative to the pillar garnish 34 and the center pillar 36 is maintained by the above-described fixing device which is provided by the engaging clips 26 integrally formed in the lower faces of the horizontal wall portions 24 of the respective connecting bodies 14. The engager 30 of each engaging clip 26 is brought into engagement at a selected one of the engaging shoulders 32 with the corresponding one of engaging holes 38 which are formed in the center pillar 36, as shown in FIG. 4, whereby the structure 10 is fixed to the center pillar 36 such that the above-described lateral-wall extending direction coincides with a shock-receiving direction in which a shock is to be primarily applied to the structure 10.

The present shock absorbing structure 10 is compact in size, owing to the main bodies 12 each having the relatively small height, thereby permitting the structure 10 to be accommodated into a space on the side of the pillar garnish 34 of any one of various types of motor vehicles, while maintaining the above-described effective distance at a sufficiently large amount. Further, each connecting body 14 can be deflected owing to the suitable degrees of flexibility and rigidity thereof, making it possible to position the structure 10 in such a position that permits the main bodies 12 to most efficiently absorb a shock energy generated by contact of the occupant with the pillar garnish 34. That is, the structure 10 is capable of being installed in any one of narrow spaces having various shapes, and exhibiting an excellent shock absorbing effect.

Thus, the present structure 10 advantageously eliminates the necessity of changing its shape or configuration depending upon the shape or configuration of the accommodating space which varies depending upon the type of motor vehicle. The structure 10 can be used in various types of motor vehicles, without changing its configuration, thereby leading to an increase in the production efficiency and a reduction in the production cost of the shock absorbing structure 10.

In the present structure 10, each connecting body 14 is constituted by the vertical wall portion 22 and the horizontal wall portion 24 consisting of the respective plates, and the plates are formed integrally with each other such that the connecting body 14 has the L-shaped cross section. The flexibility and rigidity of the connecting body 14 can be easily and accurately adjusted to respective optimum degrees, by simply changing the thickness and width of the vertical wall portion 22 and those of the horizontal wall portion 24. Thus, the structure 10 has another advantage that the flexibility and rigidity provided in the entirety of the structure 10 is easily adjusted whereby the shock absorbing effect is easily exhibited by the structure 10 with high stability.

In the present structure 10, the vertical wall portion 22 and the horizontal wall portion 24 are formed integrally with each other such that the connecting body 14 has the L-shaped cross section as described above. Thus, the structure 10 has a further advantage that one of the vertical and horizontal wall portions 22, 24 serves as a reinforcing portion for reinforcing the other of the vertical and horizontal wall portions 22, 24, so as to connect the main bodies 12 with a sufficiently large strength, thereby assuring a sufficient mechanical strength of the structure 10.

The present structure 10 includes the fixing device constituted by the engaging clips 26 which are formed on the lower surfaces of the horizontal walls 24 of the connecting bodies 14 and which include the respective engagers 30. The engager 30 of each engaging clip 26 is brought into engagement at one of the engaging shoulders 32 with the corresponding one of engaging holes 38 which are formed in the center pillar 36, whereby the structure 10 is fixed to the center pillar 36. This fixing device makes it possible to fixedly position the main bodies 12 relative to the pillar garnish 34 and the center pillar 36 with high reliability, even where the connecting bodies 14 are deflected in such a manner that causes the connecting bodies 14 to be separated from the center pillar 36 or even where the center pillar 36 has a curved shape so that there are left gaps between the lower surfaces of the connecting bodies 14 and the surface of the center pillar 36 which surface is opposed to the pillar garnish 34. That is, the engager 30 of each engaging clip 26 is engaged at the one of the engaging shoulders 32 with the engaging hole 38 of the center pillar 36, wherein the one of the engaging shoulders 32 can be suitably selected on the basis of amounts of the gaps between the lower surfaces of the connecting bodies 14 and the surface of the center pillar 36.

In the present structure 10, each main body 12 consists of the tubular wall 16 and the ceiling wall 18 which closes the upper opening of the tubular wall 16, wherein the ceiling wall 18 is formed integrally with the tubular wall 16. Owing to this arrangement, even when a shock or impact force is applied to a local portion of the ceiling wall 18, the impact force acts equally on the four lateral walls 20 of the tubular wall 16, without being concentrated onto one or ones of the four lateral walls 20, whereby the impact energy is efficiently absorbed by each main body 12.

While the presently preferred embodiment of this invention has been described in detail, for illustrative purpose only, it is to be understood that the present invention is not limited to the details of the illustrated embodiment, but may be otherwise embodied.

For instance, in the above-illustrated embodiment, each connecting body 14 is constituted by the first and second connecting portions in the form of the respective vertical and horizontal wall portions 22, 24 which are formed integrally with each other such that the connecting body 14 has the L-shape cross section. However, the vertical and horizontal wall portions 22, 24 may consist of respective members which are formed independently of each other, so that the connecting body 14 is constituted by the mutually independent members.

In either of the case where the vertical and horizontal wall portions 22, 24 are formed integrally with each other and the case where the vertical and horizontal wall portions 22, 24 are provided by the mutually independent members, the arrangements of each of the vertical and horizontal wall portions 22, 24, such as the number of each of the vertical and horizontal wall portions 22, 24 provided in each connecting body 14 and the position of each of the vertical and horizontal wall portions 22, 24 relative to each connecting body 14, are not limited to the details of the above-illustrated embodiment, but may be suitably changed depending upon, for example, the required degree of rigidity of the shock absorbing structure 10.

In the above-illustrated embodiment, the first and second connecting bodies of each connecting body 14 are respectively provided by the plate-shaped vertical and horizontal wall portions 22, 24. However, the first connecting portion may have other shape configured to be deflectable more easily in the perpendicular direction perpendicular to the above-described lateral-wall extending direction than in the lateral-wall extending direction, while the second connecting portion may have other shape configured to be deflectable more easily in the lateral-wall extending direction than in the perpendicular direction perpendicular to the lateral-wall extending direction.

While each main body 12 and each connecting body 14 are formed of the same kind of olefin resin material in the above-illustrated embodiment, the main body 12 and the connecting body 14 may be formed of respective resin materials which are the same in kind but are different from the olefin resin material, or may be formed of respective resin materials different from each other, as long as at least the connecting body 14 is formed of a synthetic resin having a certain degree of flexibility.

In the above-illustrated embodiment, each lateral wall 20 of the tubular main body 12 extends in the direction inclined with respect to the axis of the tubular main body 12 such that the distance from the lateral wall 20 to the axis reduces as viewed in the direction away from the lower side of the lateral wall 20 toward the upper side of the lateral wall 20. However, each lateral wall 20 may be inclined with respect to the axis of the main body 12 such that the distance from the lateral wall 20 to the axis increases as viewed in the direction away from the lower side of the lateral wall 20 toward the upper side of the lateral wall 20. In either of these cases, it is preferable that each lateral wall 20 is inclined with respect to the axis by an angle of 3–10°, because the angle smaller than 3° makes it difficult to form the main body 12 in the manufacturing process while the angle larger than 10° causes a deterioration in the shock absorbing characteristics of the structure 10. It should be understood, however, that the inclination of each lateral wall 20 with respect to the axis of the main body 12 is not essential, and that each lateral wall 20 may extends in parallel to the axis of the main body 12.

While the ceiling wall 18 is provided to close the upper opening of the tubular wall 16 of each tubular main body 12 in the above-illustrated embodiment, the ceiling wall 18 is not essential. That is, the upper opening of the tubular wall 16 may be left open.

Further, the arrangements of the main bodies 12 such as the number of the main bodies 12 and the positions of the main bodies 12 relative to each other, are not limited to the details of the above-illustrated embodiment. For example, while the main bodies 12 connected by the connecting bodies 14 are arranged along the single line in the above-illustrated embodiment, the main bodies 12 may be arranged along two or more lines.

In addition, the configuration of each main body 12 is not limited to the detail of the above-illustrated embodiment, either. For example, while the tubular main body 12 has the rectangular shape in its cross section taken in a plane perpendicular to the axis in the above-illustrated embodiment, the tubular main body may have a triangular, pentagonal, hexagonal or other polygonal cross sectional shape, or may have a circular sectional shape, so that the circumferential or tubular wall consists of three, five, six or other number of lateral walls, or consists of a straight or tapered cylindrical wall.

It is also noted that each main body may consist of a box-like body, in place of the tubular body, as in a shock absorbing structure 40 which is constructed according to another embodiment of the present invention and which is shown in FIG. 5. This shock absorbing structure 40 is identical with the above-illustrated shock absorbing structure 10 except that each of a plurality of main bodies 42, which are connected by a plurality of connecting bodies 44, consists of two lateral walls 50, 50 and a ceiling wall 48. The two lateral walls 50, 50 extend substantially in the shock-receiving direction, and are opposed to each other in the longitudinal direction of the structure 40. The ceiling wall 48 extends from the upper side of one of the two lateral walls 50, 50 to the upper side of the other lateral wall 50, so as to connect the two lateral walls 50, 50. Each main body 42 does not include a lateral wall which is parallel to the longitudinal direction of the structure 40, so that the main body 42 has openings in respective opposite ends as viewed in the width direction of the structure 40. The shock absorbing structure 40 is mounted on the inside of a vehicle interior component in the same manner as the shock absorbing structure 10, so that the structure 40 cooperates with the interior component to constitute a shock absorbing assembly.

While the illustrated embodiments of the invention are the shock absorbing structures which are advantageously mounted on the inside of a pillar garnish of a motor vehicle, and the shock absorbing assemblies each constituted by the shock absorbing structure and the pillar garnish, it is to be understood that the principal of the invention is equally applicable to shock absorbing structures to be mounted on the inside of other vehicle interior component such as a roof side rail, and also to shock absorbing structures to be incorporated in any vehicles other than the motor vehicles.

It is to be understood that the present invention may be embodied with various other changes, modifications and improvements, such as those described in the SUMMARY OF THE INVENTION, which may occur to those skilled in the art, without departing from the spirit and scope of the invention defined in the following claims:

What is claimed is:

1. A shock absorbing structure for a vehicle, comprising:
   a plurality of main resin bodies each including a lateral wall that extends substantially in a shock-receiving direction in which a shock is to be primarily applied to said shock absorbing structure, said main resin bodies being spaced apart from each other such that the lateral walls of said main resin bodies are opposed to each other in a direction in which said main resin bodies are spaced apart from each other; and
   at least one resin connecting body connecting every adjacent pair of said main resin bodies,
   wherein each of said at least one resin connecting body includes a first connecting portion and a second connecting portion,
   wherein said first connecting portion has a shape configured to be deformable more easily in a perpendicular direction that is perpendicular to said shock-receiving direction, than in a parallel direction that is parallel to said shock-receiving direction, and a width of the first connecting portion is not substantially larger than one-half of the height of the lateral walls of the main resin bodies,
   and wherein said second connecting portion has a shape configured to be deformable more easily in said parallel direction than in said perpendicular direction.

2. A shock absorbing structure according to claim 1, wherein said main resin bodies are arranged in a single line that is parallel to said direction in which said lateral walls of said main resin bodies are opposed to each other.

3. A shock absorbing structure according to claim 1, further comprising a fixing device which fixes said main resin bodies to a component of said vehicle, wherein said fixing device is provided by at least one engaging member which includes a strut extending from said at least one resin connecting body and an engager extending from a distal end of said strut toward said at least one resin connecting body, said engager having a stepped surface in a free distal end portion thereof, said stepped surface having a plurality of engaging shoulders formed therein and spaced apart from each other in a direction in which said engager extends, said engager being elastically deformable so as to be brought into engagement at one of said engaging shoulders with an engaging portion of said component of said vehicle, whereby said main resin bodies are fixed to said component of said vehicle.

4. A shock absorbing structure according to claim 1, wherein said main resin bodies and said at least one resin connecting body are provided by a single piece which is made of a synthetic resin having a certain degree of flexibility.

5. A shock absorbing structure according to claim 1, wherein each of said at least one resin connecting body is formed from a synthetic resin having a certain degree of flexibility.

6. A shock absorbing assembly for a vehicle, comprising:
   the shock absorbing structure defined in claim 1; and
   an interior component of the vehicle,
   wherein said shock absorbing structure is disposed on one of opposite sides of said interior component that is remote from an occupants' compartment of the vehicle, and is mounted on a portion of said interior component which is closer to an occupant seated in an occupant's seat in the occupants' compartment of the vehicle, than the other portion of said interior compartment.

7. A shock absorbing structure according to claim 1, wherein a thickness of the first connecting portion ranges substantially from 0.8 mm to 2 mm.

8. A shock absorbing structure according to claim 1, wherein a thickness of the second connecting portion ranges substantially from 1.5 mm to 3 mm, and a width of the second connecting portion is substantially equal to that of the first connecting portion.

9. A shock absorbing structure for a vehicle, comprising:
a plurality of main resin bodies including a lateral wall that extends substantially in a shock-receiving direction in which a shock is to be primarily applied to said shock absorbing structure, said main resin bodies being spaced apart from each other such tat the lateral walls of said main resin bodies are opposed to each other in a direction in which said main resin bodies are spaced apart from each other; and
at least one resin connecting body connecting every adjacent pair of said main resin bodies,
wherein each of said at least one resin connecting body includes a first connecting portion and a second connecting portion which consist of respective plates,
wherein said first connecting portion has a thickness as measured in a perpendicular direction perpendicular to said shock-receiving direction, and a width as measured in a parallel direction parallel to said shock-receiving direction, said thickness of said first connecting portion being smaller than said width of said first connecting portion so that said first connecting portion is deformable more easily in said perpendicular direction than in said parallel direction, and a width of the first connecting portion is not substantially larger than one-half of the height of the lateral walls of the main resin bodies,
and wherein said second connecting portion has a thickness as measured in said parallel direction and a width as measured in said perpendicular direction, said thickness of said second connecting portion being smaller than said width of said second connecting portion so that said second connecting portion is deformable more easily in said parallel direction than in said perpendicular direction.

10. A shock absorbing structure according to claim 9, wherein each of said main resin bodies consists of two lateral walls extending substantially in said shock-receiving direction and opposed to each other, and a ceiling wall extending from one of said two lateral walls to the other of said two lateral walls so as to connect said two lateral walls.

11. A shock absorbing structure according to claim 10, wherein each of said at least one resin connecting body has a L shape in a cross section thereof taken in a plane perpendicular to said direction in which said lateral walls of said main resin bodies are opposed to each other, said at least one resin connecting body including a vertical plate portion and a horizontal plate portion which are provided by said first and second connecting portions, respectively, said horizontal plate portion extending in said perpendicular direction, from one of widthwise opposite end portions of said vertical plate portion which is parallel to said parallel direction.

12. A shock absorbing structure according to claim 9, wherein each of said at least one resin connecting body has a L shape in a cross section thereof taken in a plane perpendicular to said direction in which said lateral walls of said main resin bodies are opposed to each other, said at least one resin connecting body each including a vertical plate portion and a horizontal plate portion which are provided by said first and second connecting portions, respectively, said horizontal plate portion extending in said perpendicular direction, from one of widthwise opposite end portions of said vertical plate portion which is parallel to said parallel direction.

13. A shock absorbing structure for a vehicle, comprising:
a plurality of tubular main resin bodies including a tubular wall and an axis that is substantially parallel to a shock-receiving direction in which a shock is to be primarily applied to said shock absorbing structure, said tubular main resin bodies being spaced apart from each other such that the tubular walls of said tubular main resin bodies are opposed to each other in a direction in which said main resin bodies are spaced apart from each other; and
at least one resin connecting body connecting every adjacent pair of said tubular main resin bodies,
wherein each of said at least one resin connecting body includes a first connecting portion and a second connecting portion which consist of respective plates,
wherein said first connecting portion has a thickness as measured in a perpendicular direction perpendicular to said axis of each of said tubular main resin bodies, and a width as measured in a parallel direction parallel to said axis of each of said tubular main resin bodies, said thickness of said first connecting portion being smaller than said width of said first connecting portion so that said first connecting portion is deformable more easily in said perpendicular direction than in said parallel direction, and a width of the first connecting portion is not substantially larger than one-half of the height of the lateral walls of the main resin bodies
and wherein said second connecting portion has a thickness as measured in said parallel direction and a width as measured in said perpendicular direction, said thickness of said second connecting portion being smaller than said width of said second connecting portion so that said second connecting portion is deformable more easily in said parallel direction than in said perpendicular direction.

14. A shock absorbing structure according to claim 13, wherein each of said at least one resin connecting body has a L shape in a cross section thereof taken in a plane perpendicular to said direction in which said tubular walls of said tabular main resin bodies are opposed to each other, said at least one resin connecting body each including a vertical plate portion and a horizontal plate portion which are provided by said first and second connecting portions, respectively, said horizontal plate portion extending in said perpendicular direction, from one of widthwise opposite end portions of said vertical plate portion which is parallel to said parallel direction.

15. A shock absorbing structure according to claim 13, wherein each of said tabular main resin bodies has a cross section taken in a plane perpendicular to said axis, said cross section having an area which changes as viewed in said axial direction.

* * * * *